United States Patent
Furio

(10) Patent No.: US 9,146,129 B1
(45) Date of Patent: Sep. 29, 2015

(54) SUGGESTING POINTS OF INTEREST ON A MAPPED ROUTE USING USER INTERESTS

(75) Inventor: Paul J. Furio, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 163 days.

(21) Appl. No.: 13/528,549

(22) Filed: Jun. 20, 2012

(51) Int. Cl.
*G01C 21/36* (2006.01)
*G01C 21/34* (2006.01)

(52) U.S. Cl.
CPC ........ *G01C 21/3682* (2013.01); *G01C 21/3476* (2013.01); *G01C 21/3614* (2013.01); *G01C 21/3679* (2013.01); *G01C 21/3611* (2013.01)

(58) Field of Classification Search
CPC .......... G01C 21/3614; G01C 21/3682; G01C 21/3679; G01C 21/3611; G01C 21/3476
See application file for complete search history.

(56) References Cited

U.S. PATENT DOCUMENTS

| | | | |
|---|---|---|---|
| 6,401,034 B1* | 6/2002 | Kaplan et al. | 701/416 |
| 7,698,062 B1* | 4/2010 | McMullen et al. | 701/438 |
| 2010/0305855 A1* | 12/2010 | Dutton et al. | 701/213 |
| 2012/0136865 A1* | 5/2012 | Blom et al. | 707/739 |

* cited by examiner

*Primary Examiner* — John Q Nguyen
*Assistant Examiner* — Alan D Hutchinson
(74) *Attorney, Agent, or Firm* — Novak Druce Connolly Bove + Quigg LLP

(57) ABSTRACT

Methods, systems and computer program products for suggesting points of interests on a mapped route using user interests include receiving a request for a mapped route. The request can include off-route information indicating that the user is willing to visit points of interest not directly along the mapped route. That is, points of interests that may not necessarily be close to the user's mapped route but may be of high interest to the user can be presented or suggested to the user to enhance the user's travel experience or trip. The points of interest suggested can be selected based on respective relevancy scores representing a level of relevancy to a user interest. The suggested points of interest can be ranked based on the relevancy factors. The suggested point of interest displayed to the user can also be limited to those having a relevancy factor that meets a predetermined threshold.

24 Claims, 8 Drawing Sheets

SUGGESTING POINTS OF INTEREST ON A MAPPED ROUTE USING USER INTERESTS

BACKGROUND

Global Positioning System (GPS) devices receive GPS signals for the purpose of determining the device's current location on Earth. GPS devices provide latitude and longitude information that can be used to derive the current location of the GPS device. As the proliferation of GPS devices has increased, GPS devices have been incorporated into handheld or portable electronic devices such as cameras and smartphones. The GPS devices can also include maps which may be displayed on a touch-sensitive display of the GPS devices.

Some GPS devices not only determine the device's location but also provide turn-by-turn directions to direct the user of the GPS device to a desired or identified destination. Such turn-by-turn directions provide the user with directions for a selected route that are continually presented to the user in the form of spoken and visual instructions. The GPS device keeps the user up-to-date about the best route to the destination, as the GPS device takes into account traffic information, road conditions, and road construction. Some GPS devices also provide information on nearby amenities such as restaurants, fueling stations, etc. However, such information is typically categorized by type or distance from the current location of the GPS device. The information is typically user-generic and is sorted, suggested, and categorized based solely on the current location of the GPS device.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION OF THE TECHNOLOGY

Figure 1:
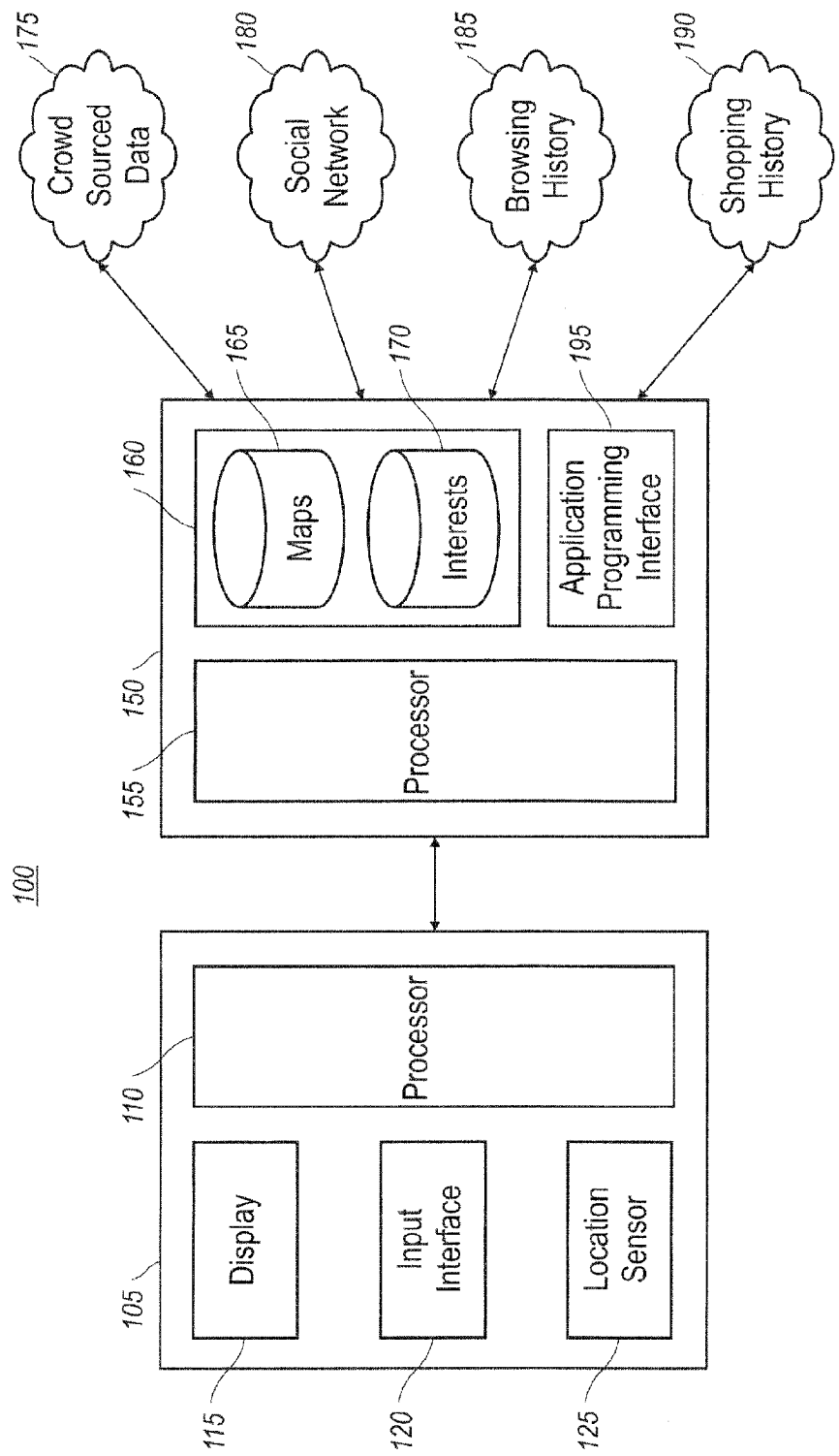
FIG. 1 is a block diagram of a system of suggesting points of interest on a mapped route using user interests in accordance with an example embodiment of the present technology.

Various embodiments of the present technology relate to methods, systems and computer program products for detecting and recognizing predetermined objects in images, captured by cameras or scanners having limited computation resources, using image gradients.

Conventional navigation systems typically do not provide the user or traveler with points of interest that are specific to the user's interests. Instead, the points of interests are categorized by type (such as food, lodging, attractions, etc.) and ranked based on distance from the mapped route. The present disclosure presents methods, systems and computer program products for suggesting points of interest on a mapped route using user interests. Using such an approach, points of interests that may not necessarily be close to the user's mapped route, but may be of high interest to the user, can be presented or suggested to the user to enhance the user's travel experience or trip. One non-limiting example can include obtaining information indicative of one or more interests of a user (for example, user interests). In one example, the one or more user interests can be derived from one or more of a browsing history, a purchase history, a social network, a comment on a crowd-sourced message board, and a review on a crowd-sourced website. The determined user interests can be ranked based on a priority score or relevancy score derived from an amount of activity associated with one or more of a browsing history, a purchase history, a social network, a comment on a crowd-sourced message board, and a review on a crowd-sourced website. A user associated with the one or more user interests can submit a request for a mapped route to a selected destination. Based on the request, a mapped route to the selected destination can be generated. The request can include off-route information. The off-route information can indicate whether the user is willing to receive suggestions for points of interest that substantially match (for example, by a matching criterion or threshold) one or more of the user's interests. The off-route information indicating that the user is willing to travel to visit suggested points of interest that are a predetermined distance from a mapped route. For example, the off-route information can include a distance the user is willing to deviate from a mapped route or an amount of travel time the user is willing to alter (for example, increase) the estimated travel time of the mapped route. One or more points of interest can then be identified based on the request and the off-route information. Additionally, one or more points of interest can be ranked based on relevancy scores associated with the points of interests. Information representing at least one of the one or more points of interest can be displayed with the mapped route. Points of interest can include attractions, restaurants, adventures, gardens, theatres, landmarks, monuments, historical sites, theme parks, museums, shopping centers, wineries, or any other venue, site, or locale that may be of interest or relevant to the user's interests.

Several definitions that apply throughout this document will now be presented.

The phrase "communicatively coupled" is defined as connected, whether directly or indirectly through intervening components and is not necessarily limited to physical connections. Coupled devices are devices which are in signal communication with one another.

The phrase "electronic device" is defined as any device that is capable of at least accepting data, transmitting data, and executing commands. For example, electronic devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

Details pertaining to methods, systems and computer program products for suggesting points of interests on a mapped route using user interests will be described in further detail below and will reference FIGS. 1-8. While FIGS. 1-8 will be discussed in terms of a server-based method and system for suggesting points of interests on a mapped route using user interests, those of ordinary skill in the art will appreciate that the method and system for suggesting points of interests on a mapped route using user interests can be performed at the user's electronic device.

FIG. 1 is a block diagram of a non-limiting example of a system 100 for suggesting points of interests on a mapped route using user interests. FIG. 1 includes an electronic device 105 communicatively coupled to a server 150.

The electronic device 105 can include, but is not limited to, a portable communication device, a mobile communication device, a mobile computer, a smartphone, a computing pad, a tablet computer, a personal computer, a desktop computer, a laptop computer, a netbook, a navigation device, a GPS device, or any other electronic device capable of at least accepting data, transmitting data, and executing commands associated with mapped routes.

In FIG. 1, the electronic device 105 can include a processor 110. The processor 110 can be communicatively coupled to the electronic device 105. The processor 110 can include one or more processors. In other embodiments, the processor 110 can be a processing system, a computing system, or any other system that is communicatively coupled to the electronic device 105 that can receive and process requests for mapped routes entered at the electronic device 105 (for example, entered using an input interface 120 of the electronic device 105). Those of ordinary skill in the art will appreciate that mapped routes can include maps, turn-by-turn navigation directions, interactive maps, or any other graphical information from which a user can base his or her traveling.

Although not illustrated, the electronic device 105 can include one or more application modules that are communicatively coupled with the processor 110. In FIG. 1, the application module can be a browser application module, a map application, a web browser application, or any other module by which the user can enter requests for mapped routes. Those of ordinary skill in the art will also appreciate that such modules can control or be configured to control the processor 105 to perform various actions. The module can be located in local storage devices (not shown), remote storage devices (not shown), or both local and remote storage devices communicatively coupled to the electronic device 105.

In FIG. 1, the electronic device 105 can include a display 115 on which graphical information can be displayed. The display 115 can be a touchscreen display, a liquid crystal display (LCD), a light emitting diode display (LED), an active matrix organic light emitting diode display (AMOLED), or any other display on which graphical information can be displayed. In FIG. 1, the display 115 can be configured to display search results, web content, overlay interfaces, or any other graphical information associated with mapped routes or points of interests.

The electronic device 105 can also include a location sensor 125. For example, the location sensor 125 can be a GPS sensor, a gravitometer, or any other sensor by which the location of the electronic device 105 can be determined.

The electronic device 105 can also include an input interface 120. The input interface 120 can include one or more of a keyboard, a touchscreen, a touch-sensitive display, an auxiliary user input, a microphone, a gaze-tracking input, a motion detector, a camera, or any other input interface which can sense, detect, or receive inputs. For example, such inputs can include gazing inputs, touch inputs, voice commands, motion inputs, keyboard inputs, mouse clicks, touchscreen inputs, or any other similar input by which a user of the electronic device 105 can enter information or commands, or make selections.

As illustrated in FIG. 1, the electronic device 105 can be communicatively coupled to the server 150 via a communication interface (not shown). The communication interface can include a peer-to-peer (P2P) interface, a Bluetooth® interface, a near-field-communication (NFC) interface, a near-field-communication-peer-to-peer (NFC P2P) interface, a Wi-Fi interface, an internet-interface, or any other interface which allows the electronic device 105 to transmit and receive information from the server 150.

The server 150 can be a web-based server, a cloud-based server, a network-based server, a system of servers or any other server or servers. In other embodiments, the server 150 can be a central computing device remote from the electronic device 105. In FIG. 1, the server 150 can be associated with a computer system configured to generate mapped routes and suggested points of interest. In FIG. 1, the server 150 can include a processor 155. The processor 155 can be communicatively coupled to the server 150. The processor 155 can include one or more processors. In other embodiments, the processor 155 can be a processing system, a computing system, or any other system that is communicatively coupled to the server 150 that can receive and process requests for mapped routes from the electronic device 105 and can transmit at least one of a mapped route and at least one suggested point of interest, if requested by the electronic device 105.

In FIG. 1, the server 150 can include an application programming interface 195. The application programming interface 195 can be a server-based map application, a server-based script associated with a map application, a web-based map application, or any other application which can receive and process requests for mapped routes from the electronic device 105 and transmit mapped routes and suggested points of interests corresponding to the request received from the electronic device 105 and one or more user interests determined for the electronic device 105. Those of ordinary skill in the art will appreciate that the application programming interface 195 can control or be configured to control the processor 155 to perform various actions. The application programming interface 195 can be located in local storage devices (not shown), remote storage devices (not shown), or both local and remote storage devices communicatively coupled to the server 150.

In FIG. 1, the server 150 can also include one or more computer readable storage media 160. The computer readable storage media 160 can store one or more databases 165, 170 containing information from which the server 150 can generate mapped routes and suggested points of interest. For example, in FIG. 1, the computer readable storage media 160 can include a maps database 165 and an interests database 170.

The maps database 165 can include pre-generated maps, location information associated with points of interests, geographical coordinates, previously-generated maps, previously-generated driving directions, or any other data from which the server 150 can generate or determine a mapped route.

The interests database 170 can include lists of one or more user interests associated with one or more users. As the server 150 is communicatively coupled with a plurality of electronic devices 105, the server 150 can store, for each electronic device 105 and in the crests database 170, a list of one or more user interests associated with a respective electronic device 105. In other embodiments, the interests database 170 can include a plurality of lists of one or more user interests associated with one user. In either embodiment, the one or more user interests can be derived from or determined from one or more of a browsing history 185, a purchase or shopping history 190, a social network 180 (for example, by determining, analyzing, and monitoring tags pertaining to likes/dislikes, event attendances, event invitations, memberships to fan pages or group pages, comments regarding objects, events, or places, or any other actions in a social network that are indicative of a user's interest), a comment or review on a crowd-sourced message board or a crowd-sourced website 175 (for example, a review of a movie, documentary, product, hotel, book, restaurant, or any other comment or review that is indicative of a user's interest), or any other resource from which the processor 155 of the server 150 can determine a user's interests. For example, the processor 155 can determine one or more interests based at least on a purchase history 190 of the user. The purchase history 190 can be retrieved from an e-commerce website or a web-browser history of the user's electronic device 105. As users typically purchase items that are representative of his or her interests, the server 150 can determine one or more of the user's interests based on the user's purchase history 190. For example, if a user's purchase history 190 includes a large number of sports memorabilia and sports gear (for example, golf-related memorabilia and gear), the server 150 can determine that the user has at least one user interest in sports, and specifically golf.

The interests database 170 can be created or built on a per user basis. That is, the interests database 170 can create a list for each user that communicates or requests information (such as a mapped route request) from the server 150. The interests determined for each user can be ranked or prioritized. That is, the interests associated with one user can be ranked by a level of interest or a level of priority (such as a priority value). For example, each interest determined for a user can be associated with a ranking value. The ranking value can be based on a level of browsing from browsing history 185, a number of items purchased from purchase or shopping history 190, an amount of commenting or activity on a social network 180 (for example, by a number of tags pertaining to likes/dislikes, a number of requests to become a member of a fan page or a group page, a number of events attended, a number of received invitations to an event, a number of comments regarding objects, events, or places, or any other amount of action in a social network that is indicative of a user's interest), a number of comments or reviews on a crowd-sourced message board or a crowd-sourced website 175, or any other similar quantifiable action from which the server 150 can derive or determine a user's level of interest in a respective user interest. For example, in one embodiment, the server 150 can determine two user interests associated with one user based on a purchase or shopping history 190. A first of the user interests can be swimming. The first user interest can be based on a determination that the user has made more purchases for swimsuits, suntan lotion, flip flops, and beach towels than other items in his or her purchase history 190. A second of the user interest can be wine. The second user interest can be based on a determination that the user has made more purchases for wine, bottle openers, wine glasses, picnic baskets, and winery travel guides than for any other items except for swimming-related items. The processor 150 can then assign a ranking value for each of the user interests based on the number of purchases associated with the user interest. For example, the ranking value assigned to the user interest "swimming" can be a larger value than the ranking value assigned to the user interest "wine," as the user has made more purchases associated with user interest "swimming" than the user interest "wine." When the server 150 stores these user interests in the interests database 170, the user interests can be sorted or ranked based on the ranking values assigned to the user interests. Such ranking values can then be utilized in selecting, identifying, and determining which points of interest to suggest to the user of an electronic device 105 that has requested a mapped route with off-route information. In other embodiments, the ranking value can be user-defined, as will be described below in FIG. 4.

In at least one embodiment, if the processor 155 of the server 150 determines at least one user interest, the processor 155 can query the maps database 165 for points of interests based at least in part on data or information corresponding to or associated with a determined user interest (for example, golf). The query can return points of interest, along or proximate to the mapped route, that are related to golf. For example, the returned points of interest can include a golf museum, a golf store, a golf hall of fame, a golf-themed restaurant, a golf course, a driving range, or any other point of interest that one having a user interest in golf would find interesting or relevant. The processor 150 can further narrow the points of interest based at least in part on off-route information included in the user's request for a mapped route. For example, the off-route information can include a user-defined or user-selectable distance that the user is willing to deviate, venture away, wander, or stray from the mapped route (for example, from a main route of the mapped route). The off-route information can also include a user-defined or user-selectable amount of travel time that the user is willing to alter the estimated travel time of the mapped route. Based on the user-defined or user-selectable distance or travel time, the processor 150 can rank the points of interest retrieved from the maps database 165. For example, the processor 150 can associate a relevancy score for each of the points of interests. The relevancy score can be based on a value associated with criteria derived from the off-route information submitted by the user (that is, the user-defined or user-selectable distance or travel time). The relevancy score can also be based on a value representing an amount of metadata associated with the point of interest that matches criteria associated with the determined user interest. The values of the relevancy score can be weighted. For example, the value representing an amount of metadata associated with the point of interest that matches matching criteria associated with the determined user interest can be weighted greater than the value associated with criteria derived from the off-route information submitted by the user. Based on the relevancy scores associated with one or more returned points of interest, the processor 155 can select a subset of the returned points of interest to transmit to the electronic device 105. For example, the processor 155 can select a subset of points of interests based on the relevancy scores of the points of interest. For example, the subset of points of interests can have relevancy scores that meet or exceed a predetermined threshold. The processor 155 can also rank the points of interest in the selected subset. For example, the processor 155 can rank the points of interest in the selected subset by one or more of: the relevancy scores, the distance from the mapped route, and the travel time from the mapped route. The selected subset can then be transmitted from the server 150 to the electronic device 105 for display on the electronic device's display 115.

In FIG. 1, while the application programming interface 195 is illustrated as being separate from the computer readable storage media 160, it will be appreciated that the application programming interface 195 can be stored on the computer readable storage media 160 along with the maps database 165 and the interests database 170. Also, while FIG. 1 illustrates the server 150 as storing the maps database 165 and the interests database 170 in a computer readable medium 160, it will be appreciated that one or both of the maps database 165 and the interests database 170 can be stored on a remote device (not shown). Additionally, while FIG. 1 illustrates the interests database 170 being stored at the server 150 and the server's processor 155 building or determining the user interests, those of ordinary skill in the art will appreciate that the interests database 170 can be stored at the electronic device 105. Additionally, the processor 110 of the electronic device 105 can determine user interests. The processor 110 of the electronic device 105 can also build or create the interests database 170 at the electronic device 105.

In yet another embodiment, the maps database 165 and the interests database 170 can be associated with a mapping service and an interests service, respectively. For example, the server 150 (or the electronic device 105) can transmit a request to a map service for a mapped route corresponding to a received mapped route request from the electronic device 105. The map service can then transmit one or more mapped routes corresponding to the mapped route request from the electronic device 105. Similarly, where the mapped route requests also includes off-route information indicating that the user desires to receive suggested points of interest, the server 150 can request from the map service one or more points of interest within a predetermined distance or travel time (derived from the off-route information) from the mapped route. The map service can then transmit the one or more points of interest to the server 150. The server 150 can then determine or select one or more points of interest transmitted by the map service to suggest (for example, as suggested points of interest) to the electronic device 105. The server 150 can select the one or more points of interest based on relevancy scores as will be described below.

In another embodiment where a map service is utilized, the points of interest stored by the map service can each have respective metadata. The metadata can include descriptors associated with the points of interest. For example, the metadata associated with a point of interest that is a golf course can include metadata such as a type (e.g., "recreation"), a title ("Par Golf Course"), an address (such as the physical address, GPS coordinates, etc.), a description (for example, a number of driving ranges, a number of holes, etc.), or any other information that can be included in metadata for a point of interest. The processor 150 can then query the map service for points of interest using the user interests stored in the interests database 170. For example, the processor 150 can query the map service for points of interest having metadata that matches one or more user interests stored in the interests database 170. The map server can then return points of interests that meet the criteria of the processor's query. The processor 155 can then rank the returned points of interest by assigning a relevancy score to each of the points of interest. The relevancy score can be based on an amount of metadata matching one or more user interests. For example, points of interest having a larger amount of metadata can have a higher relevancy score than points of interest having fewer metadata. The points of interest can then be ranked based on the relevancy scores. The points of interest can also be categorized based on which user interest the point of interest matches. For example, points of interest associated with a user interest "swimming" can be grouped in a first group, and points of interests associated with a user interest "golf" can be grouped in a second group.

In another example, the points of interest can be ranked based on a ranking value associated with the user interest that the point of interest matches. For example, as discussed above, where a user interest "swimming" has a higher ranking value than a user interest "wine" and where a first point of interest matching the user interest "wine" can have a higher relevancy score than a relevancy score for a second point of interest matching the user interest "swimming," the second point of interest matching the user interest "swimming" can be ranked or prioritized higher than the first point of interest matching the user interest "swimming".

The disclosure now turns to a specific example of suggesting points of interest on a mapped route using user interests.

Figure 2:
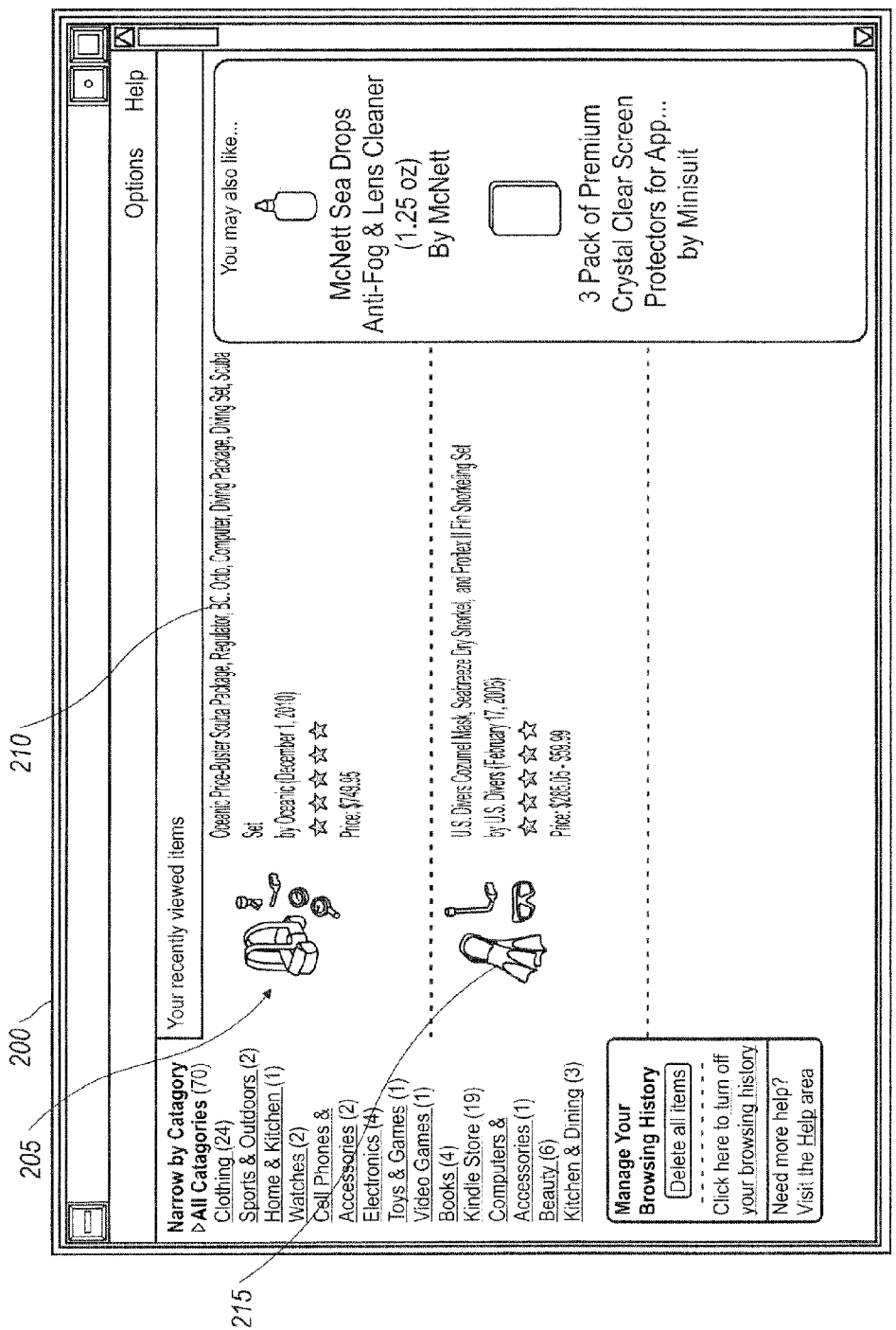
FIG. 2 is an illustration of a web browser application from which user interests can be determined in accordance with an example embodiment of the present technology.

FIG. 2 illustrates an example web browser application 200 which can be displayed on a display 115 of an electronic device 105. In FIG. 2, the web browsing application 200 illustrates an ecommerce website. For example, the ecommerce website can be a website in which website visitors can purchase items. Specifically, the web browsing application 200 illustrates a browsing history 205 of a user. For example, the browsing history 205 can represent a history of items that a user searched for or a search history of search queries that a user executed in the ecommerce website. In FIG. 2, the browsing history 205 lists recently viewed or searched items 210, 215. A first item 210 is a scuba diving package. The second item 215 is a snorkel package. Based on this browsing history 205, a processor (for example, the processor 110 of the electronic device 105) can determine that the user is interested in water activities. The processor 110 can then create a user interest "water activities" in an interests database (for example, an interests database 170 stored at the electronic device 105 or stored on a server 150).

Although not illustrated in FIG. 2, the processor 110 can assign a ranking value to the user interest "water activities." For example, if the processor 110 determines that the browsing history 205 includes more items or search queries for diving-related items than any other types of items, the processor 110 can assign a ranking value to the user interest "water activities" that is higher or larger than other ranking values (for example, larger than a ranking value for a user interest relating to trains that is based on a browsing history containing toy train purchases). In this example, the user interest "water activities" will be ranked higher or listed before the user interest "trains." However, in one embodiment, the ranking value can be user-defined or the ranking of the user interests can be modified based on a user-defined exception or exclusion. For example, if the processor 110 determined that the trains user interest should have a ranking value that is higher than the water activities user interest because the user has browsed or purchased more toy trains than diving items, the user can designate or assign a different ranking value or priority to the water activities user interest (for example, by utilizing the input interface 120 of the electronic device 105). That is, the user can input an exception or exclusion to override or modify a default ranking by the processor 110. For example, the user may want to designate the water activities interest higher than the trains interest because the trains interest is associated with the user's purchase or browsing history for toys for the user's child, whereas the purchase or browsing history for diving items was for the user, and therefore directly related to the user's interest.

While FIG. 2 illustrates the user's interest derived from a browsing history 205 conducted at the electronic device 105 from which the user will request and receive a mapped route, those of ordinary skill in the art will appreciate that the browsing history 205 (and therefore, the user's interest) can be received or derived from activity at an electronic device different from the electronic device which the user will request and receive a mapped route. For example, the electronic device 105 which the user will request and receive a mapped route can be associated or related (for example, by a shared user account or by synching) to the electronic device or electronic devices from which a user's interest can be derived.

Figure 3:
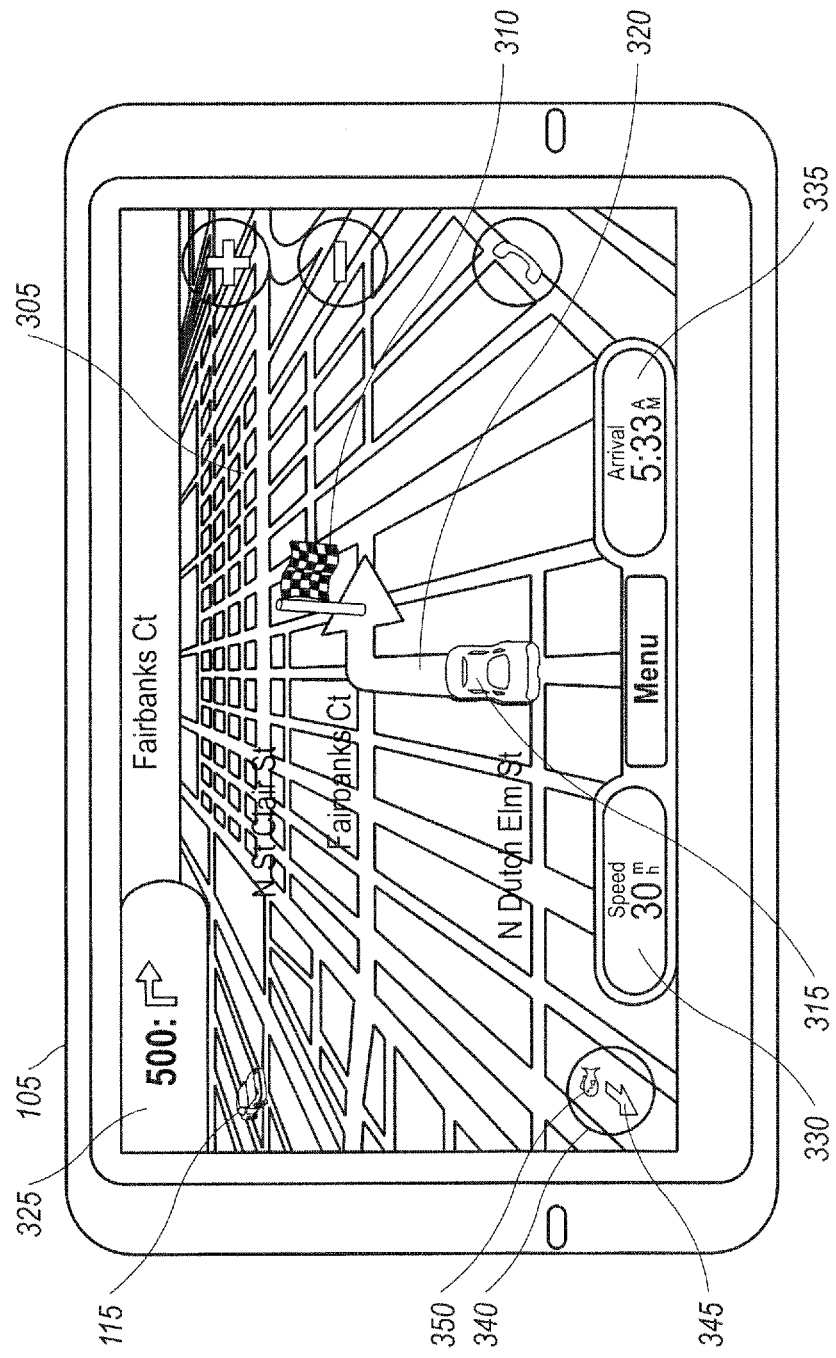
FIG. 3 is an illustration of an example electronic device in which the system and method of suggesting points of interest on a mapped route using user interests in accordance with an example embodiment of the present technology can be implemented.
Figure 5:
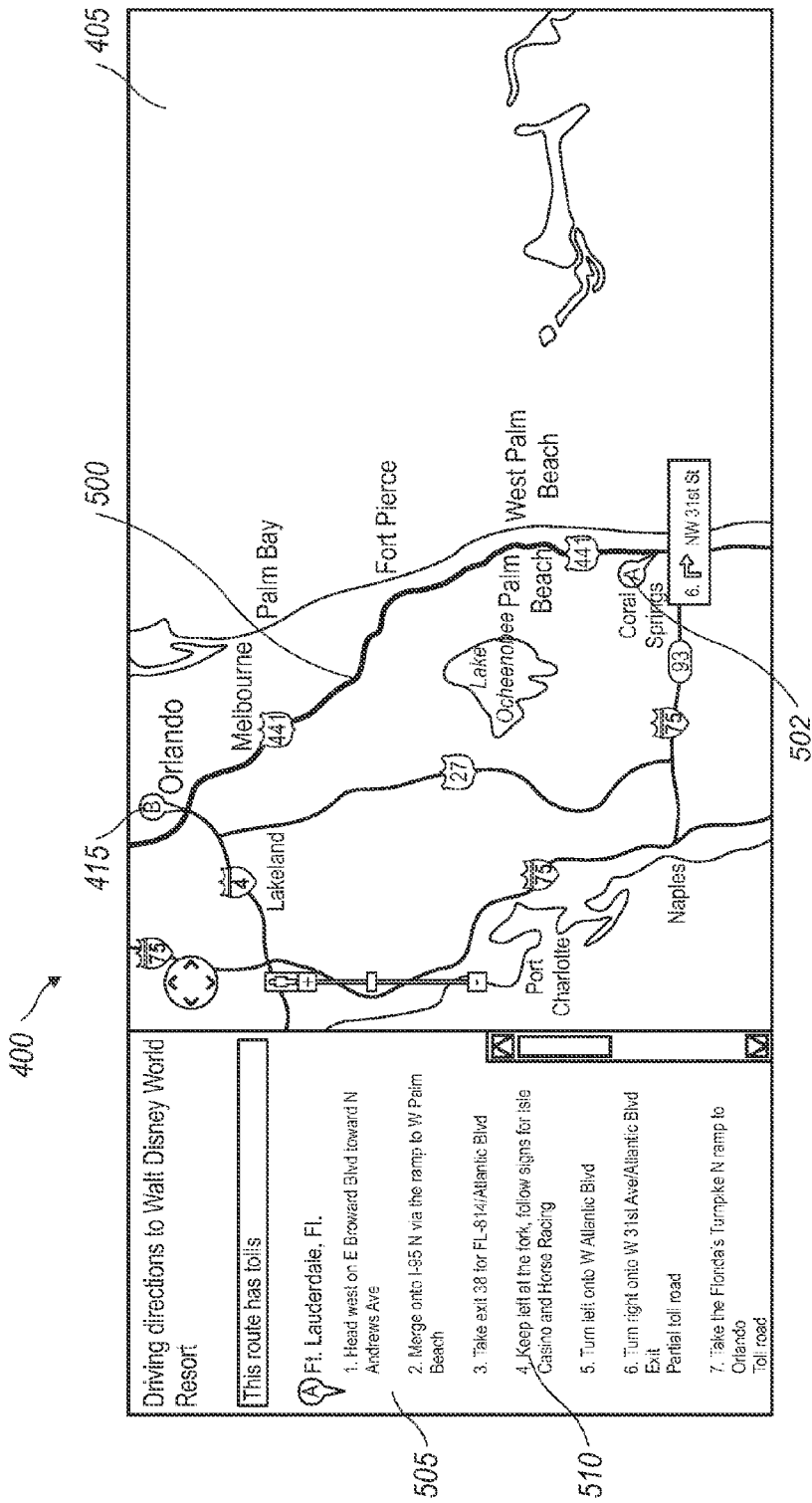
FIG. 5 is an illustration of a mapped route to the selected destination illustrated in FIG. 4, wherein the mapped route includes driving directions.
Figure 6:
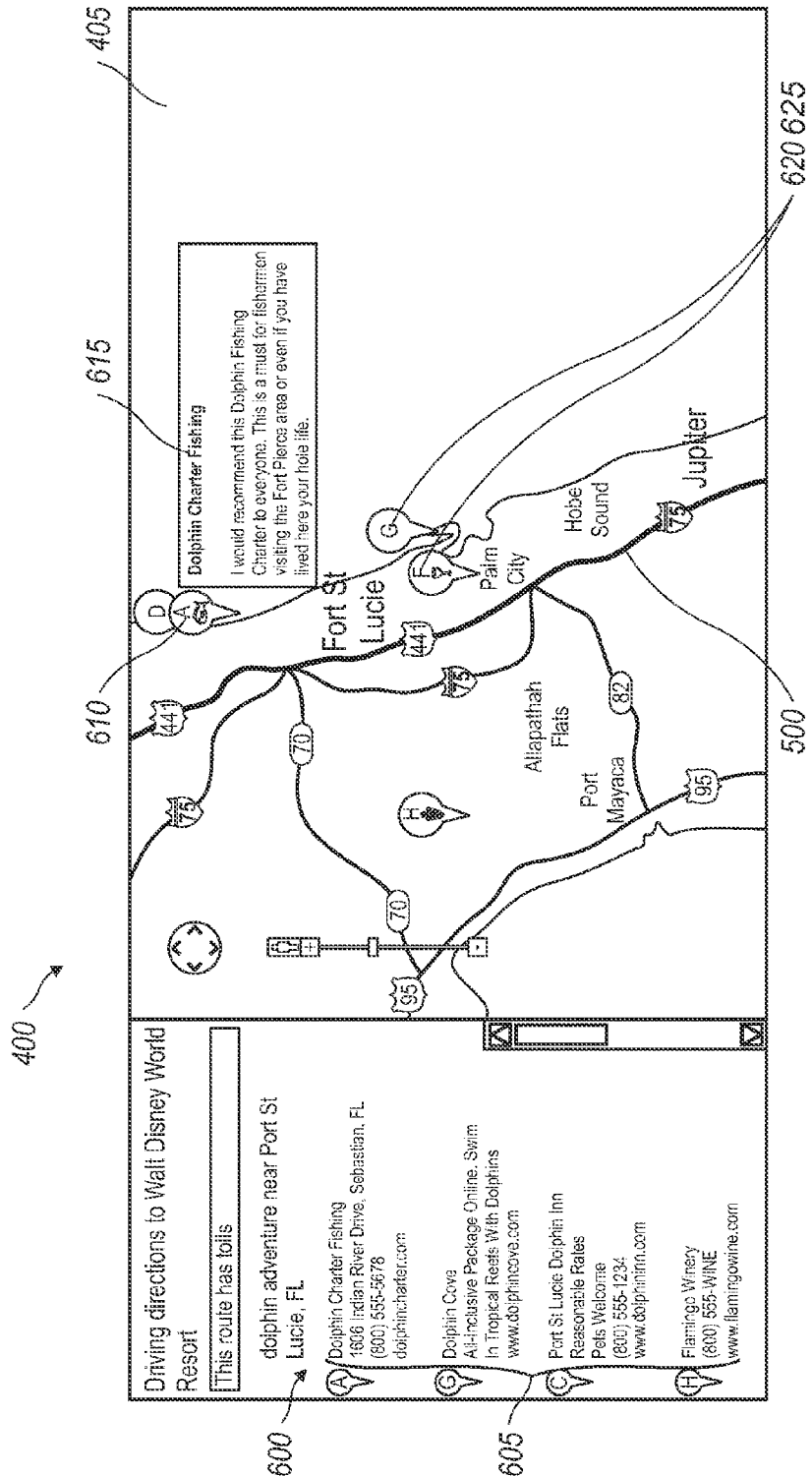
FIG. 6 is an illustration of a mapped route including suggested points of interest based on an interest of the user in accordance with an example embodiment of the present technology.

FIG. 3 illustrates an example electronic device 105 for requesting and receiving mapped routes. In FIG. 3, the electronic device 105 is a portable navigation device. The electronic device 105 includes a touch-sensitive display 115. In FIG. 3, the touch-sensitive display 115 displays a graphical user interface (GUI) 305 associated with a mapping application of the electronic device 105. The GUI 305 can include a mapped route 320 showing a final destination 310 of the mapped route 310. Specifically, in FIG. 3, the mapped route 310 is presented at the electronic device 105 as an interactive map having turn-by-turn directions 325. For example, the turn-by-turn directions 325 in FIG. 3 are represented by directional arrows and distances to indicate when and in which direction the user needs to travel to arrive at the user's final destination 310. The GUI 305 can also include a graphical representation 315 of the current location of the electronic device 105 (and therefore the current location of the user). In FIG. 3, the graphical representation 315 is an image or icon of a car but the graphical representation 315 can be any other image, text, or graphic which represents the current location of the electronic device 105. The GUI 305 can further include an estimated time of arrival (ETA) 335 or an estimated travel time. The GUI 305 can also include a current speed 330 that the user is travelling. In other embodiments, the mapped route 310 can be presented in a text form of turn-by-turn directions displayed adjacent to a map, as shown in FIGS. 4-6.

In FIG. 3, the GUI 305 includes a suggested point of interest 340. The suggested point of interest 340 can be displayed with or without interaction by the user. For example, the mapping application can be defaulted to show suggested points of interest 340 when a user submits a request for a mapped route. In other embodiments, when the user submits a request for a mapped route, the user can include off-route information in the request to indicate that the user would like to receive suggested points of interests along or within a predetermined distance or travel time from a mapped route. In such an embodiment, the suggested point of interest 340 can be presented or displayed on the GUI 305 as an icon or other graphical representation. In FIG. 3, the suggested point of interest is represented by a circle 340 having an arrow 345 and an icon 350 of a fish enclosed therein. The arrow can indicate 345 the direction in which the point of interest is located relative to the user's current location. The icon 350 can represent a type or category to which the point of interest belongs or is related. For example, the icon 350 of the fish can indicate that the point of interest is related to the user's interest in water activities, as determined in FIG. 2. In another embodiment, the icon 350 can be an image of a wine glass which can indicate that the point of interest is related to a user's interest in wine or wineries. Although not illustrated, the arrow 345 and/or icon 350 can flash, strobe, or otherwise be animated to indicate that the user is approaching or proximate to a suggested point of interest. In FIG. 3, the suggested point of interest 340 can be a user-selectable icon. When the suggested point of interest 340 is selected, detailed information can be displayed on top of, adjacent to, or in place of the GUI 305 or in a new GUI. In another embodiment, when the suggested point of interest 340 is selected, a list of points of interest within a predetermined travel time or distance of the mapped route can be displayed on top of, adjacent to, or in place of the GUI 305 or in a new GUI.

An example of a user requesting a mapped route will now be described in relation to FIGS. 4-6.

Figure 4:
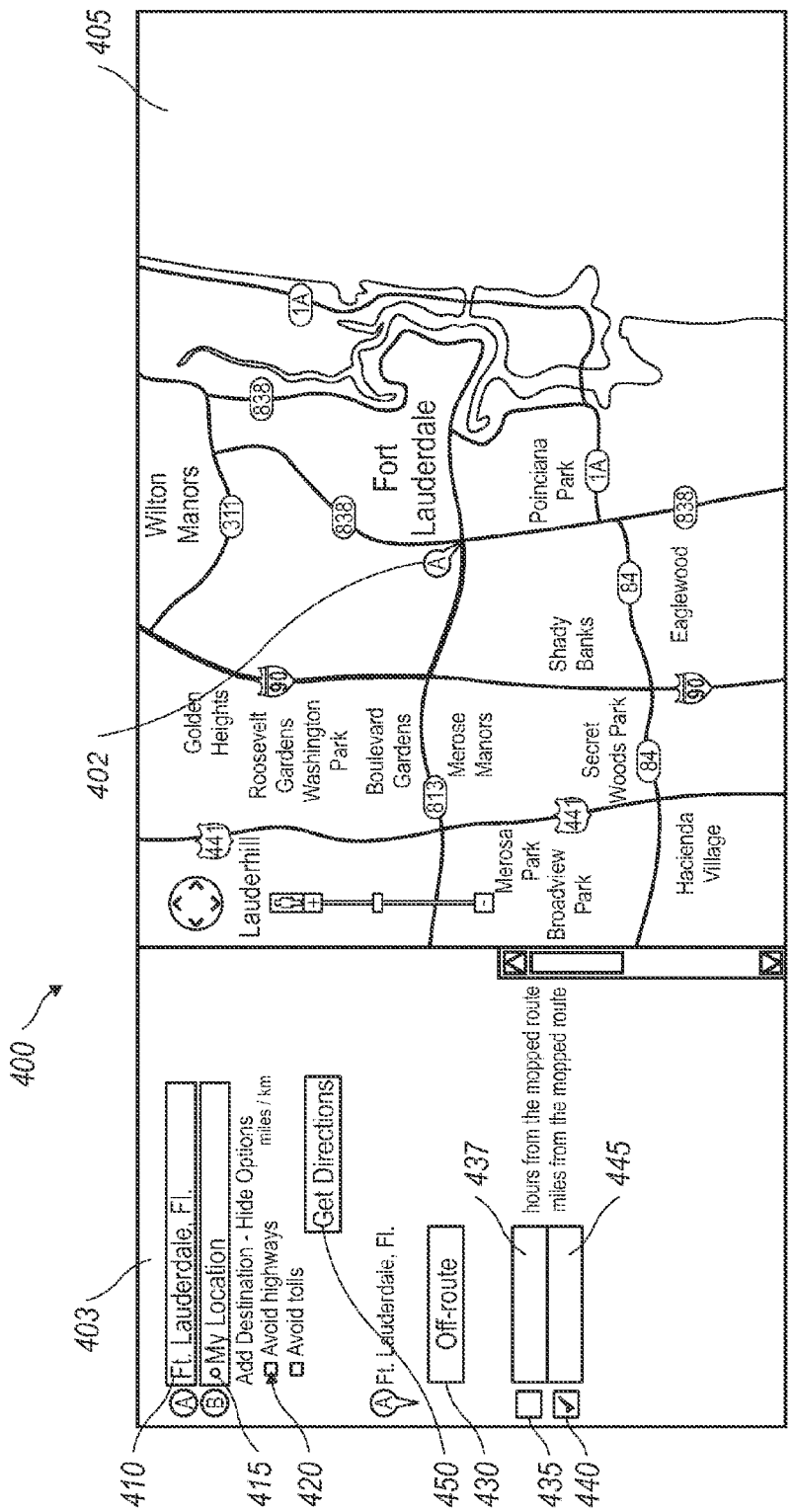
FIG. 4 is an illustration of a graphical user interface of an electronic device illustrating a selection of a destination and route information in accordance with an example embodiment of the present technology.

FIG. 4 illustrates a GUI 400 of a mapping application from which a user can request a mapped route. In FIG. 4, the GUI 400 can be displayed at a display 115 of an electronic device 105. The GUI 400 can include a plurality of sections including a request section 403 and a map section 405. The map section 405 can display a map, for example, a map of an area surrounding the electronic device's current location. In FIG. 4, the map can include a marker 402 identifying the user's or the electronic device's 105 current location or selected starting point.

The request section 403 can include input fields by which the user can request a mapped route. In FIG. 4, the request section 403 includes a start field 410. The start field 410 can correspond to the start point from which a mapped route will begin. In one embodiment, the user can input the user's current location in the start field 410. In other embodiments, the start field 410 can be automatically inputted with the current location of the electronic device 105 determined by the location sensor 125 of the electronic device 105. In FIG. 4, the user has entered a desired starting point in the start field 410. The starting point (for example, Ft. Lauderdale) can be displayed in the map section 405 along with a marker 402 (for example, a bubble) identifying the start point. The request section 403 can also include a destination point 415. The user can enter or input a destination or end point at which the mapped route will end. The user can enter an address, geographical coordinates, a zip code, a telephone number, or any other information from which the map application can determine the geographical location of the destination.

In FIG. 4, the request section 403 can include an option button 430, which when selected or otherwise designated can present off-route information fields to the user. In other embodiments, the off-route information fields can be displayed in the request section 403 without the selection or designation of the selectable option 430. The off-route information fields can include a first selectable option 435 which can indicate an amount of travel time that the user is willing to stray, depart, or wander from a mapped route. For example, an amount of travel time that the user is willing to alter the estimated travel time of the mapped route. In FIG. 4, the first selectable option 435 is a check box but in other embodiments, can be a radio button, a pull-down list, or any other selectable option. A first input field 437 can be displayed adjacent to the first selectable option 435. The first input field 437 can be a text field, a pull-down list, or any other input field by which a user can select or define an amount of travel time that the user is willing to alter the estimated amount of travel time of the mapped route. The off-route information fields can include a second selectable option 440 which can indicate a distance that the user is willing to stray, depart, or wander from a mapped route. In FIG. 4, the second selectable option 440 is a check box but in other embodiments can be a radio button, a pull-down list, any other selectable option. A second input field 445 can be displayed adjacent to the second selectable option 440. The second input field 445 can be a text field, a pull-down list, or any other input field by which a user can select or define a distance that the user is willing to stray, depart, or wander from a mapped route. Although not illustrated, the off-route information fields can include an exceptions option by which the user can identify or designate types or categories of points of interests or can identify or designate specific user interests that should be excluded from the mapped route when suggesting points of interest.

The request section 403 can also include additional parameters 420 by which the user can narrow or customize his or her mapped route. For example, in FIG. 4, the additional parameters 420 can include selectable options (such as check boxes) that indicate that the user desires to avoid highways or avoid tolls.

When the user has completed at least some of the input fields in the request section 403, the user can select a Get Directions option 450 (for example, a selectable button) to submit his or her mapped route request to a mapping application. The request can also be submitted to a mapping service, a server designated for generating mapped routes, or any other device or service configured to generate mapped routes.

In FIG. 4, if the user submits a request for a mapped route that includes off-route information, a processor associated with the mapping application can generate boundaries along the mapped route that correspond to the user's defined amount of travel time that the user is willing to alter the estimated travel time of the mapped route and/or the user's defined distance that the user is willing to stray, depart, or wander from the mapped route. For example, a circular or radial boundary can be determined along each point on a mapped route (for example, each point along the full length of the route), where the boundary corresponds to the defined amount of travel time and/or distance. The boundaries can define the areas from which the processor of the mapping application can select or suggest points of interest. For example, as discussed above, the processor can query a maps database 160 for points of interests located within one or more of the boundaries. The points of interests that are returned from the query can then be ranked based on at least one of a relevancy to a user interest, a ranking of the user interest related to the point of interest, a distance and/or travel time from the mapped route, or a distance and/or amount of travel time from the boundary defined by the user's off-route information, as discussed above.

After the request for a mapped route is submitted or transmitted to a processor configured to generate mapped routes, a mapped route can be generated and transmitted to the electronic device 105 for display on the display screen 115, as illustrated in FIG. 5. In FIG. 5, the GUI 400 can be modified to display the generated mapped route 500 (illustrated by a bolded line). In FIG. 5, the GUI 400 includes the map section 405 and a directions section 505. In FIG. 5, the directions section 505 has been replaced by the request section 403 illustrated in FIG. 4. The map section 405 can include a modified map illustrating the mapped route 500 from the start point 502, Ft. Lauderdale, to a destination point 415, Walt Disney World™. In FIG. 5, the start point 502 and destination point 415 are represented by markers that are bubbles, but the markers can be icons, triangles, flags, or any other graphical representation.

The directions section 505 can display turn-by-turn directions 510 the user will travel to arrive at his or her final destination point 415. In FIG. 5, the turn-by-turn directions 510 are displayed in text form but can be displayed in other forms such as photos, icon representations, animations, arrows, voice commands, or any other representation. In another embodiment, the turn-by-turn directions 510 can be displayed as an interactive map similar to that illustrated in FIG. 3. For example, the GUI 400 can include a zoomed-in view of map, and the turn-by-turn directions 510 can be displayed as the user approaches each turn. In FIG. 5, as the user travels along the mapped route 500, the map section 405 can be updated to show the user's current location along the mapped route 500.

Additionally, as the user travels along the mapped route, the GUI 400 can be updated to display suggested points of interest associated with the electronic device's current location on the mapped route, as illustrated in FIG. 6. That is, the displayed suggested point of interest can be generated and displayed in real time. In FIG. 6, the GUI 400 can be updated to include a suggested point of interest section 600. For example, in FIG. 6, the suggested point of interest section 600 has replaced the directions section 500 of FIG. 5. The suggested point of interest section 600 can include a list 605 of suggested points of interest. In FIG. 6, the suggested points of interest have been determined based on the user interests determined in FIG. 2, namely a water activities interest. Additionally, the points of interests listed in the list 605 of suggested points of interest have been determined and selected based on the user's off-route information included in the request for a mapped route (for example, any exceptions and the amount of travel time the user is willing to alter the estimated travel time of the mapped route and/or distance the user is willing to travel or stray from the mapped route). Specifically, in FIG. 6, the points of interest in the points of interest section 600 include a Dolphin Charter Fishing adventure suggestion, a Dolphin Cove adventure suggestion, a Port St. Lucie Dolphin Inn hotel suggestion, and a Flamingo Winery suggestion. As illustrated in FIG. 6, the points of interest displayed in the list 605 can be ranked, as discussed above. In FIG. 6, for example, the Dolphin Charter Fishing adventure suggestion is listed first to indicate that the Dolphin Charter Fishing adventure suggestion has at least one of a high relevancy score and a high ranking score associated with the water activities user interest.

While FIG. 6 illustrates four suggested points of interest, the number of points of interest included in the list 605 can be default-selected, user-defined, based on a size of a screen, based on the type of electronic device 105, based on a bandwidth, based on a minimum threshold associated with at least one of the relevancy score, ranking score, or priority, or based on any other parameter.

In FIG. 6, the map section 405 can be updated to display representations or markers 610, 620, 625 representing the points of interest listed in the list 605 displayed in the points of interest section 600. In FIG. 6, the points of interest displayed in the map section 405 can be differentiated from one another based on their relevancy to the user's interest. For example, points of interest represented by a first color can have a higher ranking score than points of interest represented by a second color. In other embodiments, the points of interests can be differentiated from one another by a size of the marker 610, 620, 625 a color, a shape, or any other differentiation. For example, in one embodiment, the points of interest can be differentiated by an icon displayed with the marker 610, 620, 625. The icon can identify the interest of the user that is associated with the point of interest. For example, in FIG. 6, the marker 610 includes an icon of a fish to indicate that the associated point of interest is related to the user's interest in water activities. The marker 625 includes an icon of a bunch of grapes to indicate that the associated point of interest is related to the user's interest in wine.

In FIG. 6, the Dolphin Charter Fishing suggestion is represented by marker 610, and the other suggested points of interest are represented by marker 620, 625. As discussed above, the Dolphin Charter Fishing suggestion is ranked as being the most relevant point of interest to the user (as indicated by the Dolphin Charter Fishing suggestion being first on the list 605 of suggested point of interest). The Dolphin Charter Fishing suggestion can be identified on the map as being the most relevant point of interest by including a pop up text box 615. The text box 615 can include a summary or detailed information describing the Dolphin Charter Fishing suggestion, photos, videos, customer reviews, comments, or any other information describing the Dolphin Charter Fishing suggestion. In one embodiment, the text box 615 can be displayed on the map when a cursor is hovered or placed adjacent to or proximate to the Dolphin Charter Fishing suggestion listed in the points of interest section 600.

Although not illustrated, at least some detailed information can be included in the list 605 of suggested points of interest. The detailed information can include a summary of the respective point of interest, a distance and/or travel time from the mapped route 500, a relevancy score, the metadata associated with the point of interest that match the user's interest, and the user interest associated with the point of interest. The detailed information can also include a selectable option by which the user can indicate that he or she desires to receive or not receive points of interest similar to the selected or respective point of interest. For example, such selectable options can include a: "show me more" option to indicate that the user desires to view more points of interest similar to the one associated with the "show me more" option, a "hide" option to hide specific types of points of interest, a "delete" option to delete one or more points of interest from the list 605, a "save" or "favorite" option to mark that corresponding point of interest as a favorite type of interest, or any other similar options. In other words, the detailed information can include selectable options by which the user can provide feedback regarding the relevancy and level of interest the user has in the suggested points of interest suggested in the GUI 400. This can thereby be used to improve the ranking of suggested points of interest and improve the selection of suggested points of interest.

In other embodiments, the detailed information can also be displayed if the user selects a suggested point of interest from the map section 405 or the point of interest section 600. For example, in FIG. 6, if the user selects the Dolphin Charter Fishing suggestion from the list 605 or from the map section 405, the electronic device 105 can determine that the user desires to visit the Dolphin Charter Fishing suggestion. In other embodiments, the user can affirmatively indicate that he or she would like to stray from the mapped route 500 to visit the point of interest, for example, by selecting of a "Visit this Point of Interest" button or any other similar option. In response to the user's indication that he or she would like to visit the Dolphin Charter Fishing suggestion, the GUI 400 can be modified to display detailed information associated with the Dolphin Charter Fishing suggestion and display directions to the Dolphin Charter Fishing suggestion, as shown in FIG. 7

Figure 7:
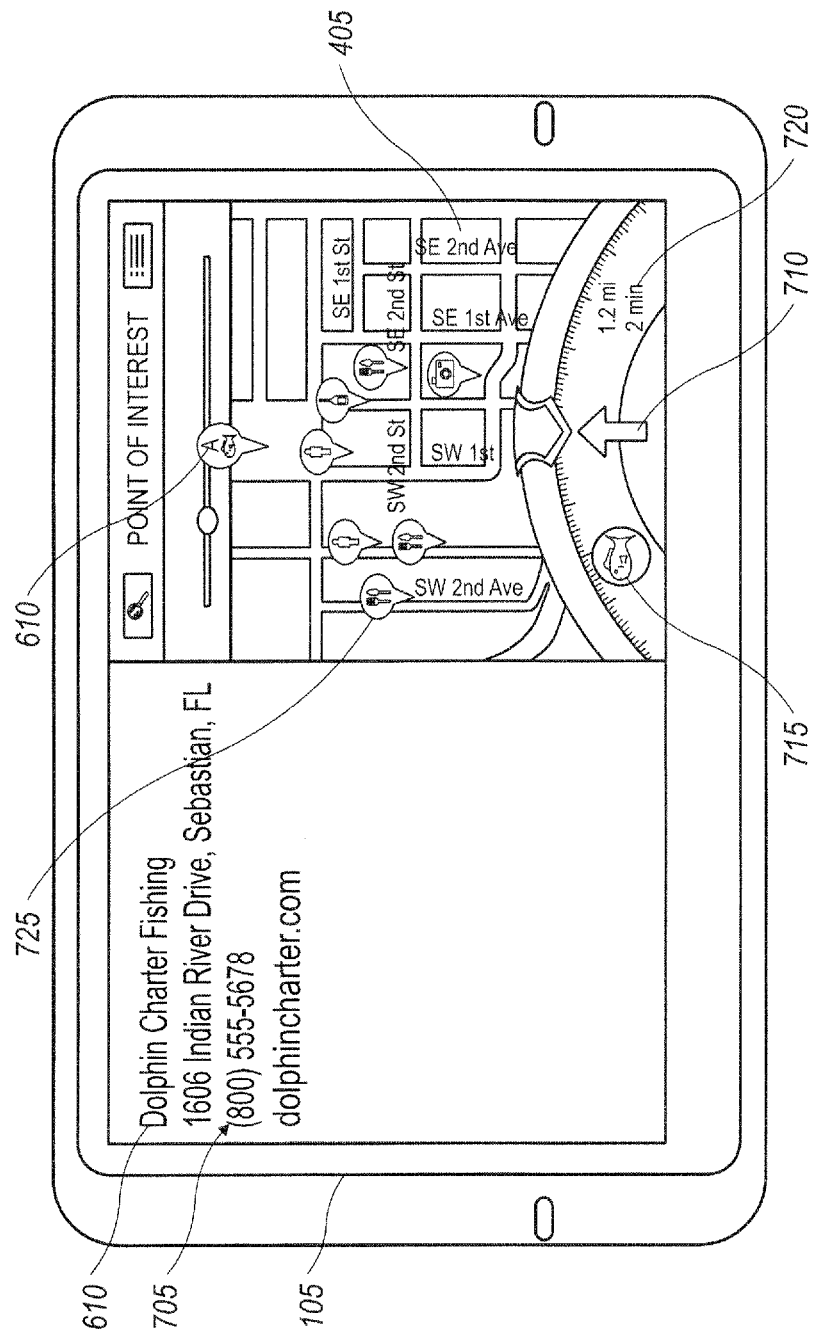
FIG. 7 is an illustration of turn-by-turn directions of a mapped route including detailed information associated with a selected point of interest in accordance with an example embodiment of the present technology.

FIG. 7 illustrates a modified GUI 400 in which the points of interest section 600 of FIG. 6 have been replaced with a detailed information section 705. The detailed information section 705 can include detailed information such as a website, a phone number, and address for the Dolphin Charter Fishing suggestion. In one embodiment, the detailed information can be selectable such that clicking or selecting the detailed information can call the point of interest, visit the website associated with the point of interest, initiate a video chat with the point of interest, send an email to the point of interest, reserve a tour at the point of interest, purchase tickets associated with the point of interest, or otherwise initiate some interaction with the point of interest.

In FIG. 7, the map section 405 has been modified to display a street view of the location of the Dolphin Charter Fishing suggestion. As shown in FIG. 7, the Dolphin Charter Fishing suggestion is identified by a marker or bubble 610. A directional arrow 710 is provided in the map section 405 to indicate the direction in which the user must travel to arrive at the Dolphin Charter Fishing suggestion at marker 610. Also illustrated in FIG. 7, the map section 405 can include an ETA 720. For example, the ETA can be represented by a time that the user will arrive at the Dolphin Charter Fishing suggestion, a remaining time, and/or a remaining distance until the user will arrive at the Dolphin Charter Fishing suggestion. The map section 405 can also include an icon 715 representing a type of interest (here, a fish) to indicate that the user has strayed from the mapped route and is en route to a point of interest. Additional points of interest located proximate to the Dolphin Charter Fishing suggestion can also be identified in the map section 405, for example, by point of interest icons 725. Specifically, in FIG. 7, the other point of interest icons 725 can include graphics that illustrate the type of point interest or the category the point of interest belongs (for example, restaurants, hotels, attractions, entertainment, etc.).

After the user has visited the point of interest at marker 610, the user can select an option (not illustrated) to generate directions to return the user back to the mapped route. For example, the option can be a "Return to Mapped Route" option, a "Finished Visit" option, a "Go Back" option, or any other option. In another embodiment, a "Mapped Route" arrow can be displayed in the map section 405 to indicate the direction in which the user should travel to return to the mapped route. For example, the "Mapped Route" arrow can be displayed in place of the point of interest icon 715.

Figure 8:
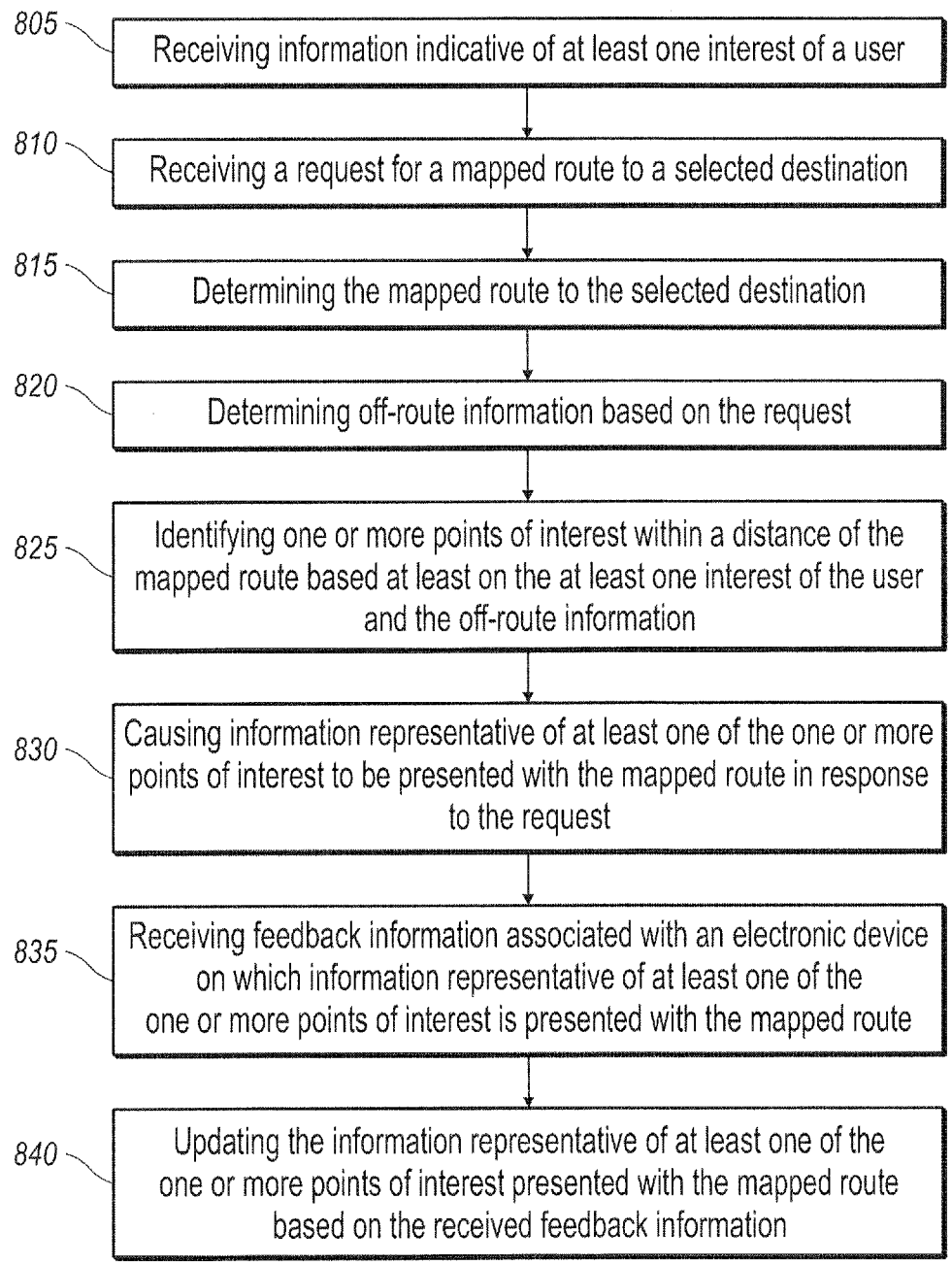
FIG. 8 is an illustration of a flow chart that generates a mapped route partially based on the off-route information in accordance with an example embodiment of the present technology.

FIG. 8 illustrates a flow chart of an example method of suggesting points of interest on a mapped route using user interests. The method 800 illustrated in FIG. 8 is provided by way of example, as there are a variety of ways to carry out the method. Additionally, while the example method 800 is illustrated with a particular order of steps, those of ordinary skill in the art will appreciate that FIG. 8 and the steps illustrated therein can be executed in any order that accomplishes the technical advantages of the present disclosure and can include fewer or more steps than illustrated.

Each block shown in FIG. 8 can represent one or more processes, methods or subroutines, carried out in example method 800. The steps illustrated in FIG. 8 can be implemented in a system including a server 150, such as that illustrated in FIG. 1. Each block shown in FIG. 5 can be carried out by a processor 155 or processing system of the server 150 illustrated in FIG. 1, a processor 110 of any electronic device 105 communicatively coupled to the server 150, or any other processing system or computer system configured to suggest points of interest on a mapped route using user interests. The flow chart illustrated in FIG. 8 will be described in relation to and make reference to the system 100 illustrated in FIG. 1.

The method 800 can begin at block 805. At block 805, information indicative of at least one interest of a user can be received. For example, a processor 155 or processing system of the server 150, a processor 110 of any electronic device 105 communicatively coupled to the server 150, or any other processing system or computer system can receive the information indicative of at least one interest of a user. As discussed above, the information indicative of at least one interest of a user can be retrieved from an interests database 170. In another embodiment, the processor 155 or 110 can receive information from which a user's interest can be derived. As discussed above, a user interest can be derived from one or more of a browsing history 185, a purchase or shopping history 190, a social network 180 (for example, by determining, analyzing, and monitoring tags pertaining to likes/dislikes, event attendances, event invitations, memberships to fan pages or group pages, comments regarding objects, events, or places, or any other actions in a social network that are indicative of a user's interest), a comment or review on a crowd-sourced message board or a crowd-sourced website 175 (for example, a review of a movie, documentary, product, hotel, book, restaurant, or any other comment or review that is indicative of a user's interest), or any other resource from which the processor 155 of the server 150 can determine a user's interests. When at least one user interest of a user is received, the method can proceed to block 810.

At block 810, a request for a mapped route to a selected destination can be received. For example, a processor 155 or processing system of the server 150, a processor 110 of any electronic device 105 communicatively coupled to the server 150, or any other processing system or computer system can receive the request for the mapped route to the selected destination. The processor or processing system that receives the request for the mapped route can be the same as or different from the processor or processing system that receives the information indicative of the at least one interest of the user. In at least one embodiment, the request for a mapped route to a selected destination can be received from an electronic device, such as a smartphone configured to provide driving directions. For example, a graphical user interface associated with a map application can be displayed on the smartphone. The user can then input a destination at the graphical user interface to request a mapped route from the user's current location to the selected destination. After the request for the mapped route to the selected destination is received, the method can proceed to block 820.

At block 815, the mapped route to the selected destination can be determined. For example, a processor 155 or processing system of the server 150, a processor 110 of any electronic device 105 communicatively coupled to the server 150, or any other processing system or computer system can determine the mapped route to the selected destination. For example, the processor can determine the user's current location using a location sensor 125 of the smartphone or by triangulating the smartphone from cellular towers proximate to the smartphone. The processor can then retrieve one or more maps 165 from a maps database 165. Based on the retrieved maps and the determined current location of the user, the processor can derive or determine the mapped route from the user's current location to the selected destination input by the user. In another embodiment, the processor can transmit a request to a map service for a mapped route from the user's current location to the selected destination. The processor can then receive the mapped route to the selected destination from the map service. When the mapped route is determined, the method can proceed to block 820.

At block 820, off-route information based on the request can be determined. For example, a processor 155 or processing system of the server 150, a processor 110 of any electronic device 105 communicatively coupled to the server 150, or any other processing system or computer system can determine the off-route information. In one embodiment, the off-route information can be user-defined. For example, the off-route information can be included in the request for the mapped route. For example, as discussed above, the user-defined off-route information can include a distance that the user is willing to deviate, venture away, wander, or stray from a main route of the mapped route. For example, as illustrated in FIG. 4, the user can input off-route information with the user's selection of a destination when requesting the mapped route. The off-route information can also include an amount of travel time that the user is willing to alter the estimated travel time of the mapped route form the user's starting point to the selected destination.

In another embodiment, the off-route information can be defined by the processor. For example, a distance to deviate from the mapped route, an amount of travel time the user is will to alter the estimated travel time of the mapped route, or both can be default-selected. For example, the processor 155 of the server 150 or the electronic device 105 can default-select the off-route information. In other embodiments, the off-route information can be determined by the processor 155 of the server 150 based on the selected destination. For example, where a selected destination is Walt Disney World™, the processor can determine that since the selected destination is a family attraction or a children's destination, children may traveling with the user, and therefore, the user will not want to increase the estimated travel time to the selected destination. Therefore, the processor can determine that off-route information will not be provided. In another embodiment, where the selected destination is Walt Disney World™ and the starting destination is a winery, the processor can determine that adults are traveling with the user, and therefore would be willing to deviate from the mapped route. In response, the processor can determine off-route information, with or without a request for off-route information from the user. In still another embodiment, the processor can transmit information to the user's electronic device 105 to display a notification, a pop-up window, or any other message that includes an inquiry as to whether the user would like the mapped route to include off-route information. After the off-route information is received or determined, the method can proceed to block 825.

At block 825, one or more points of interest within a distance of the mapped route based at least on the at least one interest of the user and the off-route information can be identified. For example, as discussed above, a point of interest that matches at least one interest of the user can be identified as a point of interest for inclusion with the mapped route. A processor 155 or processing system of the server 150, a processor 110 of any electronic device 105 communicatively coupled to the server 150, or any other processing system or computer system can identify the one or more points of interest. As discussed above, points of interest can be associated with relevancy score. The relevancy scores can correspond to an amount that a respective point of interest matches criteria associated with a respective interest of the user. Points of interest that have a relevancy score matching a predetermined criterion (for example, a threshold value) can be identified as a point of interest for inclusion with the mapped route. The points of interest can also be selected or identified based on the off-route information. For example, in one embodiment, the points of interest can first be identified by their respective relevancy scores. Then the points of interest that are identified as matching a threshold value associated with the at least one interest of the user can be filtered based on a location of the point of interest with respect to the mapped route. For example, the processor can identify, for inclusion with the mapped route, the points of interests that have a respective relevancy score matching the threshold value and that are also within the distance the user is willing to deviate from the mapped route or within the travel time the user is willing to alter the estimated travel time of the mapped route. In another embodiment, the selected destination can be utilized to identify the points of interest for inclusion with the mapped route. For example, as discussed above, where the selected destination is Walt Disney World™ which has been determined as being a family attraction, the processor can select points of interests that are relevant to interests of the user that are family-friendly or family-appropriate. For example, points of interest associated with a fishing interest, a movie interest, a train interest, or any other family-friendly interest, whereas points of interest associated with a non-family-friendly interest, such as a wine interest, can be excluded. The number of points of interests identified can be default-selected by the processor, user-defined, or based on a size of the display on which the mapped route will be displayed. After one or more points of interest are identified, the method can proceed to block 830.

At block 830, information representative of at least one of the one or more points of interest can be presented with the mapped route. For example, the processor 155 or processing system of the server 150, a processor 110 of any electronic device 105 communicatively coupled to the server 150, or any other processing system or computer system can cause information representative of at least one of the one or more points of interest to be presented with the mapped route when the mapped route is displayed on the electronic device 105. In an example embodiment, identifiers (for example, icons) can be displayed on the mapped route to identify where the points of interest are located with respect to the mapped route (for example, as illustrated in FIG. 6). The identifiers can include icons representing the type or kind of interest of the user associated with the point of interest (for example, in FIG. 6, a fish to represent a fishing or water interest of a user, a bunch of grapes to represent a vineyard interest of the user, or a wine glass to represent a wine interest of the user). In one embodiment, the points of interest presented with the mapped route can be distinguished from one another based on their respective relevancy scores. For example, a first point of interest included on the mapped route can have a first relevancy score, and a second point of interest included on the mapped route can have a second relevancy score that is less than the first relevancy score. As the first point of interest has a higher relevancy score than the second point of interest, a determination can be made that the user will prefer to visit or travel to the first point of interest rather than the second point of interest. Based on this determination, the identifier associated with first point of interest can be presented in a color that is different from that of the identifier associated with the second point of interest. In other embodiments, the size of the identifier associated with first point of interest can be larger than that of the identifier associated with the second point of interest. In still another embodiment, the identifier associated with the first point of interest can have a shape different from that of the identifier associated with the second point of interest.

Instead of or in addition to presenting information associated with the identified point of interest as identifiers or icons on the mapped route, the information representative of at least one of the one or more points of interest can be presented as a list of points of interest displayed adjacent to the mapped route (for example, as illustrated in FIG. 6). The list of points of interest can include a name associated with the point of interest (for example, a business name), an address of the point of interest, a phone number associated with the point of interest, a distance from the mapped route that the point of interest is located, an amount of travel time that the traveling to the point of interest alters the estimated travel time of the mapped route, an adjusted estimated travel time associated with traveling to the point of interest, an indication (for example, an icon) of the user interest associated with the point of interest, or any other information representative of the identified point of interest or interest. In one embodiment, the points of interest can be listed based on the relevancy scores associated with the points of interest, the distance from the mapped route or the travel time associated with the point of interest, or the user interest associated with the point of interest. For example, the points of interests can be grouped based on the user interest associated therewith. In another embodiment, the points of interest can be listed in order based on the priority value or ranking value (discussed above) associated with the user interest corresponding to the point of interest. After information representative of the at least one of the one or more points of interest are presented with the mapped route, the method can optionally proceed to block 835.

At block 835, feedback information associated with the electronic device, on which the mapped route is displayed, can be received. Feedback information can include a selection of one or more of the points of interest, information indicative of the user traveling toward one of the points of interest identified by the processor, a purchase input (as will be described below), or any other user interactions with the electronic device or any other electronic device associated with the electronic device on which the mapped route is displayed that are made while travelling along the mapped route. The processor 155 or processing system of the server 150, a processor 110 of any electronic device 105 communicatively coupled to the server 150, or any other processing system or computer system can receive the feedback information. For example, feedback information can correspond to a user interaction can include a selection or a "like" tag on a smartphone synched with the electronic device on which the mapped route is displayed. In another example, feedback information can correspond to a purchase (such as purchase input) made on the electronic device on which the mapped route is displayed or any other electronic device associated therewith. The feedback information can indicate that the user's interest has changed. In other embodiments, the feedback information can identify a refinement of the user's current interest along the mapped route. Other feedback information can include internet browsing, posting comments or reviews on a message board or website, or any other similar activity from which user interests can be derived. After feedback information is received, the method can proceed to block 840.

At block 840, the information representative of at least one of the one or more points of interest presented with the mapped route can be updated or modified based on the received feedback information. The processor 155 or processing system of the server 150, a processor 110 of any electronic device 105 communicatively coupled to the server 150, or any other processing system or computer system can update or modify the information representative of at least one of the one or more points of interest presented with the mapped route based on the received feedback information. In one embodiment, the information representative of at least one or more points of interest can be updated or modified by at least one of: removing at least one point of interest, replacing at least one point of interest, or adding at least one point of interest based on the received feedback information. For example, in an embodiment where the electronic device 105 displaying the mapped route is an on-board navigation device included in a dashboard of a vehicle, the feedback information can correspond to actions on a smartphone that is associated (for example, synched) with the electronic device 105. In one example, a passenger operating a smartphone synched with the electronic device 105 can interact with a social network 180 by tagging a museum page with a "like" tag. This interaction can be processed by the electronic device 105 as feedback information. For example, the electronic device 105 can determine that the user has a current interest that is a museum user interest. Because of the recency of the like tag, a high priority value or ranking value can be assigned to the user interest "museum." The point of interest section 600 of the GUI 400 can then be updated with points of interest relating to a user interest "museum" as opposed to a user interest "water activities."

In another embodiment, where the electronic device 105 displaying the mapped route is an on-board navigation device included in a dashboard of a vehicle, the feedback information can correspond to actions on a smartphone that is synched with the electronic device 105, where the actions are associated with a purchase of a song entitled "Go to the Beach." Other purchase inputs can include purchasing a product via an ecommerce webpage, browsing an ecommerce webpage, purchasing tickets to an attraction or event, purchasing admission to an attraction located along the mapped route, purchasing an item associated with a displayed point of interest, or any other purchase input. In the example, where the purchase input is associated with a song entitled "Go to the Beach," the processor can determine that the user or a passenger travelling with the user has a current interest in beach-related activities. The processor can then update the points of interest to exclude or remove at least one point of interest that is unrelated to beach-related activities. In another embodiment, the processor can modify the points of interest such that the points of interest that are related to beach-related activities are displayed more prominently than other points of interest. In still another embodiment, the processor can determine that a beach interest has a higher priority value or ranking than other interest of the user and re-rank the user's interests. For example, the processor can place the points of interest associated with the beach interest higher in a list of points of interest than other points of interests. In another example, based on the re-ranking of the user interests, the processor can identify a new set of points of interest based that are related to the beach interest. Alternatively, the processor can modify the current set of points of interest to replace the points of interest that are unrelated to the beach interest with those points of interests that are related to the beach interest.

In yet another embodiment, the feedback information can correspond to a selection of one or more of the points of interest displayed or presented with the mapped route (for example, a selection of the point of interest to view additional information or detailed information with the selected point of interest). Based on the selection of the point of interest, the processor can determine that the interest associated with the selected point of interest is the user's current interest. The processor can then re-assign or modify the ranking value or priority value of the interest determined to be the user's current interest to indicate that the corresponding interest should have a higher value than other interests represented by the points of interest. Then, the processor can modify or alter the information representative of at least one of the one or more points of interest such that the points of interest represented on the mapped route are associated with the interest determined to be the user's current interest. In other embodiments, the points of interests associated with the interest determined to be the user's current interest can be distinguished or displayed more prominently than the other points of interest presented with the mapped route. In still another embodiment, a new set or list of points of interests that are associated with the user's current interest can be identified and presented with the mapped route. While FIG. 8 illustrates utilizing feedback information to identify or modify points of interest, those of ordinary skill in the art will appreciate that blocks 835 and 840 can be optionally included.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology. CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of suggesting points of interest along a mapped route, comprising:
    under control of one or more computer systems configured with executable instructions,
    receiving information indicative of at least two interests of a user, the information being derived from at least one type of user activity data;
    assigning a respective ranking value to each interest of the at least two interests of the user, each respective ranking value based at least in part on an amount of the user activity data associated with the associated interest of the user;
    receiving a request for a mapped route to a selected destination, the request including off-route information provided by the user;
    determining the mapped route to the selected destination;
    determining the off-route information based on the request, the off-route information including at least one of a distance the user is willing to deviate from the mapped route or an additional travel time the user is willing to travel from the mapped route;
    determining a boundary surrounding the mapped route, a shape of the boundary determined at least in part using the off-route information;
    identifying two or more points of interest associated with the at least two interests of the user within the boundary;
    determining a respective relevancy score for each point of the at least two or more points of interest, the relevancy score indicative of an amount that a respective point of interest matches criteria associated with a respective interest of the user;
    selecting a subset of the two or more points of interest that have relevancy scores that satisfy a threshold for display with the mapped route;
    ranking the subset of the two or more points of interest, the ranking for each point of interest based at least in part on the ranking value for the respective interest of the user associated with the point of interest, the relevancy score for the point of interest, and the off-route information; and
    causing information representative of at least one of the two or more points of interest to be presented with the mapped route in response to the request.

2. The computer-implemented method of claim 1, wherein the mapped route comprises an estimated travel time.

3. The computer-implemented method of claim 1, wherein causing information representative of at least one of the one or more points of interest to be presented with the mapped route comprises:
    causing information representative of at least two points of interest to be presented with the mapped route, each of the at least two points of interest having a respective relevancy score, the respective relevancy score representing an amount that a respective point of interest matches criteria associated with the at least one interest of the user; and wherein the information representative of the at least two points of interest includes information for differentiating the at least two points of interests based at least on the relevancy scores.

4. The computer-implemented method of claim 1, further comprising excluding at least one of the points of interest based at least on a user-defined exclusion.

5. A computer-implemented method, comprising:
receiving, at a processor of an electronic device, a request from a user for a mapped route, the request including off-route information provided by the user;
determining at least two interests of the user based at least in part on one or more types of user activity data;
assigning a respective ranking value to each interest of the at least two interests of the user, each respective ranking value based at least in part on an amount of the user activity data associated with the associated interest of the user;
determining the off-route information including at least a route deviation limit;
determining a boundary surrounding the mapped route, a shape of the boundary determined at least in part using the route derivation limit;
determining at least two points of interest based at least upon the determined interests of the user within the boundary;
determining a respective relevancy score for each point of the at least two or more points of interest, the relevancy score indicative of an amount that a respective point of interest matches criteria associated with a respective interest of the user;
selecting a subset of the two or more points of interest that have relevancy scores that satisfy a threshold for display with the mapped route;
ranking the subset of the two or more points of interest, the ranking for each point of interest based at least in part on the ranking value for the respective interest of the user associated with the point of interest, the relevancy score for the point of interest, and the off-route information; and
transmitting data for displaying, on a display screen of the electronic device, the mapped route and information representing the at least two points of interest.

6. The computer-implemented method of claim 5, wherein the information representing at least one of the at least one point of interest includes a list of the at least one point of interest located within a threshold distance from at least a portion of the mapped route.

7. The computer-implemented method of claim 5, wherein the mapped route comprises turn-by-turn directions; and wherein transmitting data for displaying the mapped route comprises transmitting information associated with one or more of the at least one point of interest that is located within a threshold distance from at least a portion of the mapped route.

8. The computer-implemented method of claim 5, wherein the mapped route comprises an estimated travel time, and wherein the route deviation limit includes at least one of a distance the user is willing to deviate from the mapped route or a travel time by which the user is willing to alter the estimated travel time.

9. The computer-implemented method of claim 5, wherein transmitting data for displaying the mapped route and points of interest comprises:
causing information representative of at least two points of interest to be presented with the mapped route, each of the at least two points of interest having a respective relevancy score, the respective relevancy score representing an amount that a respective point of interest matches a matching criterion associated with the determined interest of the user; and
wherein the information representative of the at least two points of interest includes information for differentiating the at least two points of interests based at least on the relevancy scores.

10. The computer-implemented method of claim 5, further comprising determining, based on the off-route information, a second mapped route that includes at least one identified point of interest.

11. The computer-implemented method of claim 5, wherein each of the at least one point of interest has a relevancy score, the method further comprising:
transmitting data for displaying, at the display screen of the electronic device, a list of the at least one point of interest in an order based on the relevancy scores.

12. The computer-implemented method of claim 5, wherein the one or more types of user activity data include a browsing history, a purchase history, a social network, a comment on a crowd-sourced message board, or a review on a crowd-sourced web site.

13. The computer-implemented method of claim 5, wherein, more than one interests are determined for the user, each of the more than one interests is associated with a priority value, and the more than one interests are ranked based at least in part on the priority value.

14. The computer-implemented method of claim 13, wherein the more than one interests are ranked based at least upon user-defined criteria.

15. The computer-implemented method of claim 14, wherein the user-defined criteria includes a user-defined exclusion indicative of points of interests to exclude from the mapped route.

16. The computer-implemented method of claim 5, further comprising:
receiving a purchase input after transmitting data for displaying the mapped route comprising points of interest; and
based on receiving the purchase input, updating the at least one point of interest based at least in part on an item of the purchase input.

17. A system for suggesting points of interest on a mapped route, the system comprising:
a processor; and
a memory device including instructions that, when executed by the processor, cause the processor to:
receive, at the processor of an electronic device, a request from a user for a mapped route, the request including off-route information provided by the user;
determine at least two interests of the user based at least in part on one or more types of user activity data;
assign a respective ranking value to each interest of the at least two interests of the user, each respective ranking value based at least in part on an amount of the user activity data associated with the associated interest of the user;
determine the off-route information including a route deviation limit;
determine a boundary surrounding the mapped route, a shape of the boundary determined at least in part using the route derivation limit;
determine at least two points of interest based at least upon the determined interests of the user within the boundary;

determine a respective relevancy score for each point of the at least two or more points of interest, the relevancy score indicative of an amount that a respective point of interest matches criteria associated with a respective interest of the user;

select a subset of the two or more points of interest that have relevancy scores that satisfy a threshold for display with the mapped route;

rank the subset of the two or more points of interest, the ranking for each point of interest based at least in part on the ranking value for the respective interest of the user associated with the point of interest, the relevancy score for the point of interest, and the off-route information; and transmit data for displaying, on a display screen of the electronic device, the mapped route request and information representing at least one of the at least two points of interest.

18. The system of claim 17, wherein the request for the mapped route comprises the off-route information, and wherein the deviation limit comprises a predetermined distance to deviate from the mapped route.

19. The system of claim 17, wherein the memory device includes further instructions that, when executed by the processor, cause the processor to:

derive the interest of the user from the one or more types of user activity data including at least one of a browsing history, a purchase history, a social network, a comment on a crowd-sourced message board, and a review on a crowd-sourced website.

20. The system of claim 19, wherein the mapped route comprises turn-by-turn directions; and wherein transmitting data for displaying the mapped route comprises transmitting information associated with one or more of the at least one point of interest that is located within a threshold distance from at least a portion of the mapped route.

21. A non-transitory computer-readable medium containing a computer program product for suggesting points of interest on a mapped route including instructions that, when executed by at least one computing device, cause the at least one computing device to:

receive, at a processor of an electronic device, a request from a user for a mapped route, the request including off-route information provided by the user;

determine at least two interests of the user based at least in part on one or more types of user activity data;

assign a respective ranking value to each interest of the at least two interests of the user, each respective ranking value based at least in part on an amount of the user activity data associated with the associated interest of the user;

determine the off-route information including a route deviation limit;

determine a boundary surrounding the mapped route, a shape of the boundary determined at least in part using the route derivation limit;

determine at least two points of interest based at least upon the determined interests of the user within the boundary;

determine a respective relevancy score for each point of the at least two or more points of interest, the relevancy score indicative of an amount that a respective point of interest matches criteria associated with a respective interest of the user;

select a subset of the two or more points of interest that have relevancy scores that satisfy a threshold for display with the mapped route;

rank the subset of the two or more points of interest, the ranking for each point of interest based at least in part on the ranking value for the respective interest of the user associated with the point of interest, the relevancy score for the point of interest, and the off-route information; and transmit data for displaying, on a display screen of the electronic device, the mapped route request and information representing at least one of the at least two points of interest.

22. The computer program product of claim 21, wherein the request for the mapped route comprises the off-route information, and wherein the deviation limit comprises a predetermined distance to deviate from the mapped route.

23. The computer program product of claim 21, wherein the computer program product comprises further instructions, that when executed by at least one computing device, cause the at least one computing device to:

derive the interest of the user from the one or more types of user activity data including at least one of a browsing history, a purchase history, a social network, a comment on a crowd-sourced message board, and a review on a crowd-sourced website.

24. The computer program product of claim 21, wherein the mapped route comprises turn-by-turn directions; and wherein transmitting data for displaying the mapped route comprises transmitting information associated with one or more of the at least one point of interest that is located within a threshold distance from at least a portion of the mapped route.

* * * * *